(12) United States Patent
Sriram et al.

(10) Patent No.: US 11,205,086 B2
(45) Date of Patent: Dec. 21, 2021

(54) DETERMINING ASSOCIATIONS BETWEEN OBJECTS AND PERSONS USING MACHINE LEARNING MODELS

(71) Applicant: NVIDIA Corporation, Santa Clara, CA (US)

(72) Inventors: Parthasarathy Sriram, Los Altos, CA (US); Fnu Ratnesh Kumar, Campbell, CA (US); Anil Ubale, Cupertino, CA (US); Farzin Aghdasi, East Palo Alto, CA (US); Yan Zhai, Santa Clara, CA (US); Subhashree Radhakrishnan, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 18 days.

(21) Appl. No.: 16/678,100

(22) Filed: Nov. 8, 2019

(65) Prior Publication Data

US 2020/0151489 A1 May 14, 2020

Related U.S. Application Data

(60) Provisional application No. 62/760,690, filed on Nov. 13, 2018.

(51) Int. Cl.
*G06K 9/34* (2006.01)
*G06N 3/08* (2006.01)
(Continued)

(52) U.S. Cl.
CPC .......... *G06K 9/34* (2013.01); *G06K 9/00362* (2013.01); *G06K 9/00771* (2013.01); *G06K 9/42* (2013.01);
(Continued)

(58) Field of Classification Search
None
See application file for complete search history.

(56) References Cited

U.S. PATENT DOCUMENTS 9,449,216 B1 * 9/2016 Dhua ................. G06K 9/00261
10,861,170 B1 * 12/2020 Li ........................ G06K 9/6273
(Continued)

FOREIGN PATENT DOCUMENTS

WO WO-2012001947 A1 * 1/2012 ......... H04N 5/23219

OTHER PUBLICATIONS

Detecting and Recognizing Human-Object Interactions. Gkioxari et al. (Year: 2017).*
(Continued)

*Primary Examiner* — Delomia L Gilliard
(74) *Attorney, Agent, or Firm* — Shook, Hardy & Bacon L.L.P.

(57) ABSTRACT

In various examples, sensor data—such as masked sensor data—may be used as input to a machine learning model to determine a confidence for object to person associations. The masked sensor data may focus the machine learning model on particular regions of the image that correspond to persons, objects, or some combination thereof. In some embodiments, coordinates corresponding to persons, objects, or combinations thereof, in addition to area ratios between various regions of the image corresponding to the persons, objects, or combinations thereof, may be used to further aid the machine learning model in focusing on important regions of the image for determining the object to person associations.

5 Claims, 11 Drawing Sheets

(51) Int. Cl.
   *G06N 3/04* (2006.01)
   *G06K 9/00* (2006.01)
   *G06K 9/42* (2006.01)
   *G06T 7/246* (2017.01)

(52) U.S. Cl.
   CPC ............ *G06N 3/0454* (2013.01); *G06N 3/08* (2013.01); *G06T 7/248* (2017.01); *G06T 2207/10016* (2013.01); *G06T 2207/20084* (2013.01); *G06T 2207/30196* (2013.01); *G06T 2207/30232* (2013.01); *G06T 2207/30241* (2013.01)

(56) References Cited

U.S. PATENT DOCUMENTS

| | | | | |
|---|---|---|---|---|
| 2013/0325787 | A1* | 12/2013 | Gerken | G06N 5/048 706/52 |
| 2014/0071287 | A1* | 3/2014 | Tu | G06K 9/00751 348/150 |
| 2016/0277646 | A1* | 9/2016 | Carr | G06T 7/277 |

OTHER PUBLICATIONS

Convolutional Feature Masking for Joint Object and Stuff Segmentation. Dai et al. (Year: 2015).*

Dai, Bo, Yuqi Zhang, and Dahua Lin. "Detecting visual relationships with deep relational networks." In Proceedings of the IEEE Conference on Computer Vision and Pattern Recognition, pp. 3076-3086. 2017.

Girshick, Ross. "Fast R-CNN." In Proceedings of the IEEE international conference on computer vision, pp. 1440-1448. 2015.

Gkioxari, Georgia, Ross Girshick, Piotr Dollár, and Kaiming He. "Detecting and recognizing human-object interactions." In Proceedings of the IEEE Conference on Computer Vision and Pattern Recognition, pp. 8359-8367. 2018.

Liao, Wentong, Bodo Rosenhahn, Ling Shuai, and Michael Ying Yang. "Natural language guided visual relationship detection." In Proceedings of the IEEE Conference on Computer Vision and Pattern Recognition Workshops, pp. 0-0. 2019.

Mao, Junhua, Jonathan Huang, Alexander Toshev, Oana Camburu, Alan L. Yuille, and Kevin Murphy. "Generation and comprehension of unambiguous object descriptions." In Proceedings of the IEEE conference on computer vision and pattern recognition, pp. 11-20. 2016.

Yu, Licheng, Patrick Poirson, Shan Yang, Alexander C. Berg, and Tamara L. Berg. "Modeling context in referring expressions." In European Conference on Computer Vision, pp. 69-85. Springer, Cham, 2016.

Zhang, Ji, Yannis Kalantidis, Marcus Rohrbach, Manohar Paluri, Ahmed Elgammal, and Mohamed Elhoseiny. "Large-scale visual relationship understanding." In Proceedings of the AAAI Conference on Artificial Intelligence, vol. 33, pp. 9185-9194. 2019.

Gkioxari, G., Girshick, R., Dollár, P., & He, K. (2018). Detecting and recognizing human-object interactions. In Proceedings of the IEEE Conference on Computer Vision and Pattern Recognition (pp. 8359-8367).

International Search Report and Written Opinion in International Patent Application No. PCT/US2019/060467 dated Jul. 8, 2020.

International Preliminary Report on Patentability received for PCT Application No. PCT/US2019/060467, dated May 27, 2021, 13 pages.

* cited by examiner

DETERMINING ASSOCIATIONS BETWEEN OBJECTS AND PERSONS USING MACHINE LEARNING MODELS

CROSS-REFERENCE TO RELATED APPLICATIONS

This application claims the benefit of U.S. Provisional Application No. 62/760,690, filed on Nov. 13, 2018, which is hereby incorporated by reference in its entirety.

BACKGROUND

In order to identify and assign ownership of personal belongings, surveillance systems must effectively make associations between items and persons in an environment. This determined ownership of personal items may provide insights in security by, for example, identifying if a personal item is associated with a particular person, is passed from one person to another, and/or is abandoned—and by who and/or where the item was abandoned. Surveillance systems often rely on a detection device—e.g., a camera—to monitor the environment. However, due to various parameters of the detection device (e.g., a viewing angle, a field of view, occlusion, etc.), the detection device may not capture data that is easily analyzable for associating persons to items. For example, it may be difficult to use a camera to monitor a crowded environment where many persons and items are being monitored.

Some conventional systems for object to person association may use still images of a single person and a single object to make one or more determinations. For example, where a child is kicking a ball as represented by an image, a computer vision algorithm may be used to identify what is in the captured image—e.g., "child kicking ball." However, because these still images represent only a single person and a single object, the associations between the two may not be determined. For example, when employing these conventional algorithms in a crowded environment, actions of persons with respect to objects may be falsely identified as having no relationship (e.g., a false negative detection) or inaccurately positively identified as having a relationship (e.g., a false positive detection) Other conventional systems may perform a rudimentary association between persons and objects—such as by using a union region between the objects and the persons, or bounding shapes representative thereof. However, these associations are often inaccurate. For example, in a crowded environment where two persons are present and—from a perspective of the camera—an object (e.g., a backpack) of a first person overlaps a second person (e.g., the person not carrying the backpack), these conventional systems may incorrectly generate an association between the second person and the object. As a result, the determination by the system would be inaccurate, and the resulting predictions with respect to the object may lead to ineffective security measures.

SUMMARY

The present disclosure relates, in part, to associating objects to persons by using one or more machine learning models. In contrast to conventional systems, such as those described herein, the system of the present disclosure leverages machine learning models—such as convolutional neural networks (CNNs)—to generate associations and relationships between persons and objects using data corresponding to regions of images. For example, locations of regions of an image corresponding to a person, an object, a union thereof, or an overlap thereof may be used to generate masked image data and/or coordinates for applying to machine learning models. Using a mask, rather than a crop, may be beneficial for a neural network because the spatial information—such as dimensionality of the persons and objects—may be preserved.

As such, in various embodiments, determining an association between persons and objects may leverage neural networks that are trained to calculate confidences of person to object associations using the masked image data and/or the coordinates. In some examples, a multi-channel approach may be used, where multiple versions of an image may be generated using different masks and applied to a single stream of a neural network. In another example, a multi-branch approach may be used where multiple versions of an image may be generated and provided as input to a respective branch or stream of a neural network. The outputs of each of these streams may then be concatenated, and provided to additional layers (e.g., a fully connected layer(s)) of the neural network to predict a confidence. In further embodiments, rather than generating three versions of an image, a single image may be used as input to a neural network, and region of interest (ROI) pooling may be used by the neural network to analyze the various regions of the image that correspond to the object, the person, and the union region thereof. For example, the image may be input to a series of layers of the neural network, and the output of the layers in addition to ROI coordinates may be input to ROI pooling layer(s) to help the neural network learn and predict features corresponding to the object, the person, and the union thereof. In such examples, by using the single image with ROI pooling, the runtime of the system may be decreased without a loss of accuracy with respect to predicting confidences for associations between objects and persons.

In various examples, a multi-layer perceptron (MLP) network may be used in addition to, or alternatively from, the ROI pooling. For example, the predicted confidence of the neural network using the ROI pooling may be used in addition to normalized coordinates of the bounding shape corresponding to the person, normalized coordinates of the bounding shape corresponding to the object, a ratio of the person bounding shape area to the union bounding shape (e.g., union of object and person), and a ratio of the object bounding shape to the union bounding shape to generate an updated, or final confidence for the association between the object and the person. As such, confidences predicted by the neural network including ROI pooling may be modified, or verified, by the MLP network to generate final results.

BRIEF DESCRIPTION OF THE DRAWINGS

The present systems and methods for associating objects to persons using machine learning models are described in detail below with reference to the attached drawing figures, wherein.

DETAILED DESCRIPTION OF THE INVENTION

Figure 1:
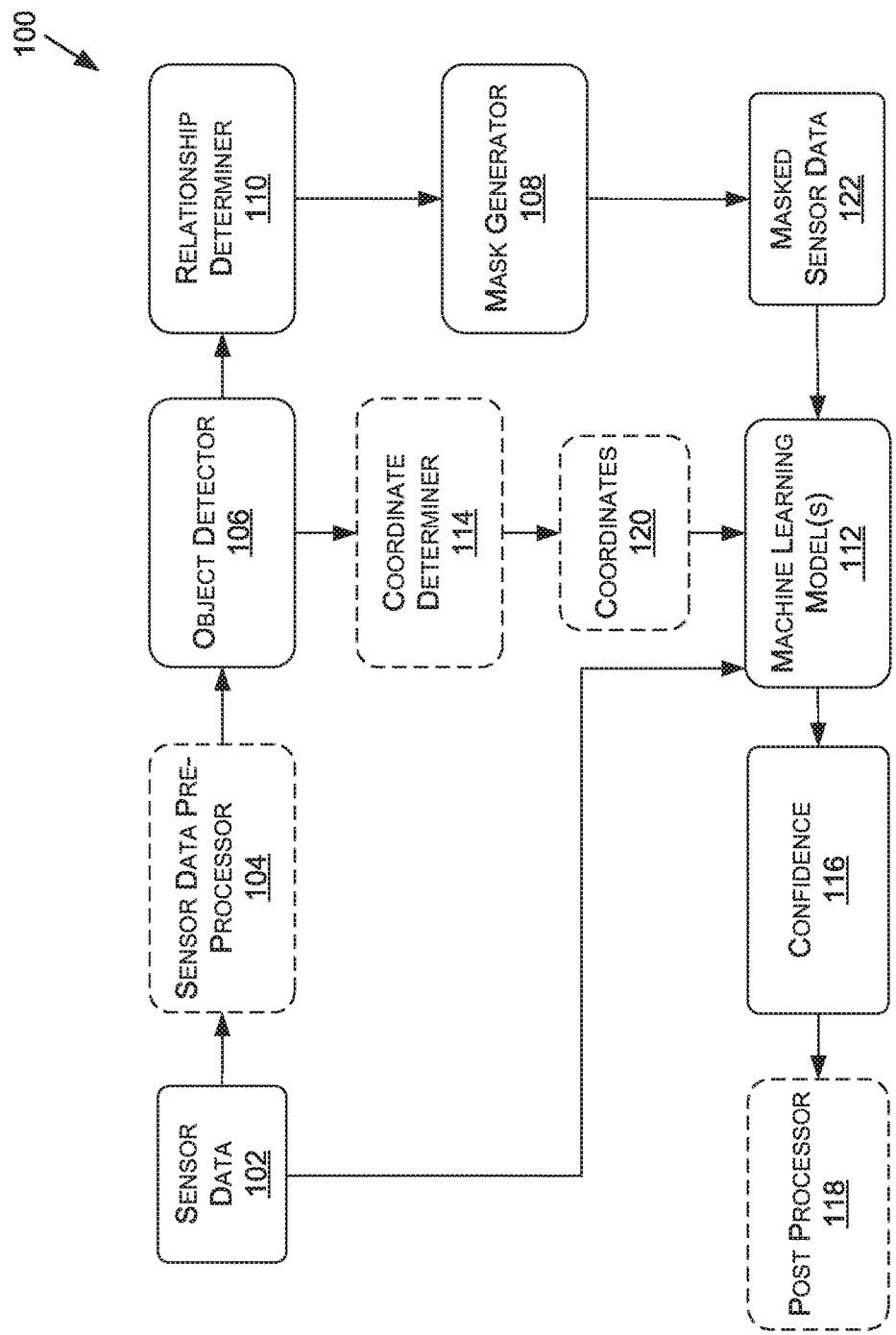
FIG. 1 is a data flow diagram illustrating an example method for associating persons with objects using a machine learning model(s), in accordance with some embodiments of the present disclosure.

Systems and methods are disclosed for associating objects to persons using machine learning models. For example, in various embodiments, determining an association between persons and objects may leverage neural networks that are trained to calculate confidences of person to object associations. In such embodiments, one or more masks may be used on captured images (e.g., still images and/or video images) to prepare the images for use by the neural network. Using a mask, rather than a crop, may be beneficial for a neural network because the spatial information—such as dimensionality of the persons and objects—may be preserved. In one example, for an image and with respect to a single person and a single object within the image, a mask may be applied to the image to generate a resulting image that includes the object (or a region of the image within a bounding shape corresponding to the object), the person (or a region of the image with a bounding shape corresponding to the person), and the union region thereof. This masked image may be fed into the neural network (e.g., a CNN), and the neural network may generate a confidence corresponding to the association between the object and the person. This process may be repeated for each of the object to person associations in the image, and the highest confidence for a particular object with a particular person may be used to determine the association for the object.

In another example, a multi-channel approach may be used, where multiple versions of an image may be generated using different masks. For example, a first image may be similar to the description above, where a mask may be applied to the image that leaves the person, the object, and the union region thereof as a result. A second image may include a mask that results in only the object (or a portion of the image corresponding to a bounding shape of the object), and a third image may include a mask that results in only the person (or a portion of the image corresponding to a bounding shape of the person). These three images may be input to a neural network as a stack, and the neural network may generate a confidence corresponding to the association between the object and the person. This process may be repeated for each of the object to person associations in the image, and the highest confidence for a particular object with a particular person may be used to determine the association for the object.

In yet another embodiment, a multi-branch approach may be used. In such an embodiment, and similar to the multi-channel approach, multiple versions of an image may be generated for each possible association between an object and a person. For example, the same three versions of an image may be generated as described above. In such an example, each of the versions of the image may be provided as input to a respective branch, or stream, of a neural network. The outputs of each of these streams may then be concatenated, and provided to additional layers (e.g., a fully connected layer(s)) of the neural network to predict a confidence. This process may be repeated for each of the object to person associations in the image, and the highest confidence for a particular object with a particular person may be used to determine the association for the object.

In some examples, in addition to the multiple branches or streams, an additional feature vector may be used by the neural network to generate the confidence values. For example, a feature vector with normalized detection coordinates may be used, where the coordinates may include coordinates of the person, the object, and/or the ratio of the person to object area. The feature vector may provide additional information extracted from the image data separately from the branches or streams of the neural network. As such, where the branches or streams of the neural network learn to predict information from the images, the feature vector provides additional information corresponding to the images to increase the amount of data used for determining the confidence.

In further embodiments, rather than generating three versions of an image, a single image may be used as input to a neural network, and region of interest (ROI) pooling may be used by the neural network to analyze the various regions of the image that correspond to the object, the person, and the union region thereof. For example, the image may be input to a series of layers of the neural network, and the output of the layers in addition to ROI coordinates may be input to ROI pooling layer(s). The ROI coordinates may include bounding shape vertices for the person, bounding shape vertices for the object, and bounding shape vertices of the union thereof. As a result, the ROI pooling layers may be used to help the neural network learn and predict features corresponding to the object, the person, and the union thereof—similar to embodiments that generate three versions of the same image—but without using multiple branches or streams. By using the single image with ROI pooling, the runtime of the system may be decreased without a loss of accuracy with respect to predicting confidences for associations between objects and persons.

In some embodiments, a multi-layer perceptron (MLP) network may be used in addition to, or alternatively from, the ROI pooling. For example, the predicted confidence of the neural network using the ROI pooling may be used in addition to normalized coordinates of the bounding shape corresponding to the person, normalized coordinates of the bounding shape corresponding to the object, a ratio of the person bounding shape area to the union bounding shape (e.g., union of object and person), and a ratio of the object bounding shape to the union bounding shape. This information may be provided as input to the MLP network—which may, in embodiments, include one or more fully connected layers—to generate an updated, or final confidence for the association between the object and the person. As such, confidences predicted by the neural network including ROI pooling may be modified, or verified, by the MLP network to generate final results.

To increase accuracy over time, such as for images from video, temporal smoothing may be used in some embodiments. For example, trajectories of persons and/or objects in an environment may be tracked across images. These trajectories, in addition to the probabilistic outputs of the neural networks described herein, may be provided as input to a recurrent neural network (RNN), such as a long short term memory (LSTM) network, and the RNN may generate predictions that indicate false positives, false negatives, and/or the like. For example, given a sequence of a length (e.g., 5, 7, 10, etc., time steps), associations that are determined in a majority, but are missing in relatively fewer images (e.g., false negatives), may be maintained throughout the entire sequence. As such, a confidence indicating a lack of association for a given image may be updated to include an association where multiple images sequentially adjacent to the given image indicate an association. Similarly, for false positives, the determination of an association may be updated to include no association where multiple images sequentially adjacent to a given image indicate no association. The RNN may be trained to more accurately predict the associations across a sequence of images than simply looking at results across the sequences of images, because the RNN may factor in trajectory information of the objects and/or persons.

Now referring to FIG. 1, FIG. 1 is a data flow diagram illustrating an example process 100 for associating persons with objects using a machine learning model(s) 112, in accordance with some embodiments of the present disclosure. While the process 100 is primarily described with respect to associating persons with objects described this is not intended to be limiting, and the process 100 may similarly be used for associating any object type (e.g., bag, food, item, package, equipment, luggage, clothing, etc.) with any other object type (e.g., person, animal, vehicle, robot, etc.) without departing from the scope of the present disclosure.

The process 100 for associating persons with objects may include generating and/or receiving sensor data 102 from one or more sensors. For example, the sensor data 102 may include image data representing an image(s), and/or image data representing a video(s) (e.g., snapshots of a video). In some instances, the images may depict one or more persons and one or more objects. Any number of sensors may be used to generate the sensor data 102. For example, where the sensors are cameras, there may be any number of cameras capturing the sensor data 102. In some embodiments, the process 100 may be used with a single camera having a field of view of an environment, while in other embodiments the process 100 may be used with any number of cameras having varying fields of view. In non-limiting examples, the camera(s) may include stereo camera(s), wide-view camera(s), infrared camera(s), surround camera(s), long-range and/or mid-range camera(s), and/or other camera types. Although described primarily as image data captured by one or more cameras, this is not intended to be limiting, and in some embodiments other sensor types (e.g., LIDAR sensors, RADAR sensors, infrared sensors, ultrasonic sensors, etc.) may be used in addition to or alternatively from cameras. In some examples, the sensor(s) may, as part of a security, surveillance, or monitoring system, such as a system installed in an environment, inside a building, outside a building, at a venue, and/or a combination thereof. In one embodiment, the sensor(s) may be associated with or disposed on a vehicle (e.g., an autonomous vehicle) or other mobile object.

In any example, the sensor data 102 may represent any image type and/or format. For example, the sensor data 102 may include compressed images such as in Joint Photographic Experts Group (JPEG) format, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC) or other type of imaging sensor.

The sensor data pre-processor 104 may use sensor data 102 representative of one or more images (or other data representations) and load the sensor data 102 into memory in the form of a multi-dimensional array/matrix (alternatively referred to as a tensor, or more specifically an input tensor, in some examples). The array size may be computed and/or represented as W×H×C, where W stands for the image width in pixels, H stands for the height in pixels and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimensions W×H×C×B. Any ordering of the dimensions may be possible, which may depend on the particular hardware and software used to implement the sensor data pre-processor 104. This ordering may be chosen to maximize training and/or inference performance of the machine learning model(s) 112.

A pre-processing image pipeline may be employed by the sensor data pre-processor 104 to process a raw image acquired by the sensors and included in the sensor data 102 to produce pre-processed sensor data. An example of a suitable pre-processing image pipeline may use a raw RCCB Bayer (e.g., 1-channel) type of image from the sensor and convert that image to an RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

The object detector 106 may receive the sensor data 102 (from the sensor data pre-processor 104, in embodiments). The object detector 106 may use a computer vision algorithm, an object detection algorithm, and/or a machine learning model(s) to detect objects and/or persons represented by the sensor data 102 (e.g., depicted in images represented by the sensor data). For example, the object detector 106 may be used—and correspondingly trained or programmed—to generate bounding shapes corresponding to objects (e.g., bags, packages, backpacks, luggage, items, etc.) and persons (e.g., people, adults, kids, animals, etc.) depicted in images (or other sensor data representations, such as depth maps from LIDAR sensors) represented by the sensor data 102. In some examples, the bounding shapes may be computed by the object detector 106 as pixel locations for vertices of the bounding shapes, pixel locations for a centroid of the bounding shapes, pixel dimensions (e.g., length and width) for the bounding shapes, pixel locations for a boundary of the bounding shapes, pixel locations for each pixel of the bounding shape, and/or a combination thereof.

In some embodiments, the bounding shapes corresponding to the person and the object may be used to generate or determine an object region (e.g., a region of the image corresponding to the object, such as the region of the image within the bounding shape corresponding to the object), a person region (e.g., a region of the image corresponding to the person, such as the region of the image within the bounding shape corresponding to the person), an overlap region (e.g., a region of the image corresponding to the overlap between the object and the person, such as the region of the image where the bounding shape corresponding to the object overlaps with the bounding shape corresponding to the person), and/or a union region (e.g., a region of the image corresponding to the combination of the region of the image corresponding to the person and the region corresponding to the object). As such, in some embodiments, the bounding shapes generated by the object detector 106 may be used to determine the person region, the object region, the union region, and/or the overlap region of the image. As described in more detail herein, one or more of these regions may be used to apply masks by a mask generator 108 to the sensor data 102 to generate masked sensor data 122 to be applied to the machine learning model(s) 112. In some examples, one or more of these regions may be used by the relationship determiner to determine associations or relationships between objects and persons (e.g., within an association region) represented by the sensor data 102.

In some embodiments, for each object detected by the object detector, a relationship confidence (e.g., confidence 116) may be determined for one or more persons also detected in an image with the object. For a non-limiting example, a confidence 116 may be determined for each object in view of each person detected from the sensor data 102. However, because some persons may be far enough away from an object in the environment depicted by the sensor data 102, determining the confidence 116 for each person may result in unnecessary computational expense, and may increase run-time of the system. As such, in some embodiments, an association region may be determined by a relationship determiner 110. For example, the relationship determiner 110 may use the outputs of the object detector 106 to filter out some persons that should not have a confidence 116 predicted for them (e.g., persons a threshold distance away from the object), and/or to focus in on the persons who should have a confidence 116 predicted for them (e.g., persons within a threshold distance to the object). For a given object detected within an instance of the sensor data 102, pixel coordinate(s) corresponding to the object may be used to determine the association region. For example, where the object detector 106 outputs a centroid corresponding to a bounding shape of the object—or where a centroid of a bounding shape may be deduced from the output of the object detector 106—the centroid may be used to generate the association region with the centroid at its center. For example, the association region may be generated to have a radius expanding from the centroid of the bounding shape. The radius may be determined, in non-limiting embodiments, as a multiple (e.g., 2×, 3×, etc.) of the radius (or height or width) of the bounding shape corresponding to the object. In other examples, the dimensions and/or location of the bounding shape corresponding object—as determined by the object detector 106—may be used to generate the association region. For example, where the dimensions and/or location of the bounding shape within an instance of the sensor data 102 are known, a multiple (e.g., 2×, 3×, etc.) of these dimensions may be used to generate the association region (e.g., the association region may be a multiple in size of the bounding shape, centered at the centroid of the bounding shape as computed by the object detector 106). As another example, a height or width of the object, or a bounding shape corresponding thereto, may be used to determine the radius. For example, the radius may be 2×, 3×, 4×, or another factor of the height or width of the object.

Once the association region is determined, the relationship determiner 110 may determine the persons (or their respective bounding shapes) that are within the association region corresponding to a given object. For example, for a given object, each person within the association region (e.g., each person at least partially within the association region, each person having a bounding shape at last partially overlapping with the association, and/or each person whose bounding shape is entirely within the association region) may be determined to have a potential relationship or association with the object. As such, this set or subset of the persons depicted in an instance of the sensor data 102 may be the persons for which a confidence 116 is determined. However, as described above, in some examples, a relationship may be determined for each person without the use of, or regardless of, the association region.

In any example, once the persons for whom a confidence 116 is generated are determined, this information may be used to determine the confidences 116 between the given or respective object and each of the persons. In some embodiments, an instance of the machine learning model(s) 112 may be applied to each object/person pair (e.g., data corresponding to the object and a first person may be applied to a first instance or instantiation of the machine learning model(s) 112, data corresponding to the object and a second person may be applied to a second instance or instantiation of the machine learning model(s) 112, and so on, for each person who is determined to be associated with or have a relationship with the object). In addition, this process may be repeated for each object, or for each object of any number of objects with which relationships are desired. As such, where it is desired to determine associations or relationships for two or more objects, data corresponding to a first object and a person may be applied to a first instance or instantiation of the machine learning model(s) 112, data corresponding to a second object and the person may be applied to a second instance or instantiation of the machine learning model(s) 112, and so on.

Depending on the embodiment, for each person/object pair determined by the relationship determiner 110, the sensor data 102 and/or the masked sensor data 122 may be applied to the machine learning model(s) 112 to predict or compute the confidence 116. In some examples, in addition to the sensor data 102 and/or the masked sensor data 122, coordinates 120 may be applied to the machine learning model(s) 112 to aid in, or provide more context for, the prediction of the confidence 116 by the machine learning model(s) 112. In embodiments where the masked sensor data 122 is used, the masks may include a person mask (e.g., masking out each portion of the image that does not correspond to the person, or the bounding shape thereof), an object mask (e.g., masking out each portion of the image that does not correspond to the object, or the bounding shape thereof), a union mask (e.g., masking out each portion of the image that does not correspond to the union of the person and the object, or the bounding shapes thereof), and/or an overlap mask (e.g., masking out each portion of the image that does not correspond to the overlap of the person and the object, or the bounding shapes thereof). As such, in non-limiting examples, the mask generator 108 may use the person region, the object region, the union region, and/or the overlap region as determined from the outputs of the object detector 106—and described in more detail herein—to determine the mask(s) for a given iteration of the machine learning model(s) 112. In some examples, the masks may include converting or changing the pixel values corresponding to the masked portions of the image to a same value (e.g., 1 or 0, corresponding to black or white). As described herein, the masks may be used in lieu of cropping the images to enable the machine learning model(s) 112 to account for a relative size or dimension of the person region, object region, union region, and/or overlap region with respect to the spatial dimension of the image(s). For example, where images were cropped rather than masked (e.g., because the input spatial dimension to the machine learning model(s) 112 must be the same for each iteration), the machine learning model(s) 112 may not be able to account for the actual size, dimension, or spatial relationship of the person, the object, the union thereof, and/or the overlap thereof. As such, by masking out the portions of the image to be ignored, the remaining portions of the image may be analyzed by the machine learning model(s) 112 with the context of the remaining portions' sizes or dimensions.

In some embodiments, as described in more detail herein, a coordinate determiner 114 may determine the coordinates 120 of the object region, the person region, the overlap region, and/or the union region—e.g. using the output of the object detector 106. As such, in some examples, the coordinate determiner 114 may determine first coordinates associated with the object region, second coordinates associated with the person region, third coordinates associated with the union region, and/or fourth coordinates associated with the overlap region. In addition, in some embodiments, the coordinate determiner 114 may determine area ratios between and among the person region, the object region, the overlap region, and/or the union region. For example, a ratio of the person region to the overlap region, a ratio of the object region to the overlap region, and/or other ratios may be determined by the coordinate determiner 114 and be represented by the coordinates 120. In any example, the coordinates 120 may include pixel locations of centroids of bounding shapes along with dimensions (e.g., pixel lengths and pixel widths of the bounding shapes), and/or may include pixel locations corresponding to vertices and/or other points along the bounding shapes (or unions or overlaps thereof).

In some embodiments, pose features may be used during training and/or during inference to improve the performance of the system. For example, the pose features may provide a key point of joints of the body of the persons, which may aid in determining whether a specific person is carrying or otherwise holding onto an object. Where an arm is bent, for example, and a bag is hanging from the bent arm, the bending of the arm may be a pose feature that provides an additional indication to the machine learning model(s) 112 that the person with the bent arm may be the one holding or otherwise associated with the bag.

Data representative of the sensor data 102 (and/or pre-processed sensor data), the masked sensor data 122, and/or the coordinates 120 may be applied to the machine learning model(s) 112—various embodiments of which are described herein at least with respect to FIGS. 2A-5C. The machine learning model(s) 112 may be trained to predict a confidence 116 corresponding to an association between the person/object pair that the input data corresponds to at each iteration. For example, the confidences 116 may represent a likelihood of the given object being owned by, carried by, or otherwise associated with the persons for which the object/person pairings are computed (e.g., for each person determined by the relationship determiner 110). In some aspects, the final determination may be that the person from the person/object pair with the highest confidence 116 is associated with the object. As such, the machine learning model(s) 112 may generate a plurality of confidences associated with each object/person pair, and the highest confidence 116 may be used—e.g., by a post-processor 118—to determine that the object belongs the person from the corresponding object/person pair. In some examples, as described herein, the confidences 116 computed by the machine learning model(s) 112 may undergo post-processing—such as temporal smoothing—using a post-processor 118.

Although examples are described herein with respect to using neural networks—and specifically convolutional neural networks (CNNs) and/or multi-layer perceptron (MLP) networks—as the machine learning model(s) 112 (e.g., with respect to FIGS. 2A-5C), this is not intended to be limiting. For example, and without limitation, the machine learning model(s) 112 described herein may include any type of machine learning model, such as a machine learning model using linear regression, logistic regression, decision trees, support vector machines (SVM), Naïve Bayes, k-nearest neighbor (KNN), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

As an example, such as where the machine learning model(s) 112 include a CNN, the machine learning model(s) 112 may include any number of layers. One or more of the layers may include an input layer. The input layer may hold values associated with the sensor data 102 (e.g., before or after post-processing), the masked sensor data 122, and/or the coordinates 120. For example, when the sensor data 102 is an image, the input layer may hold values representative of the raw pixel values of the image(s) as a volume (e.g., a width, a height, and color channels (e.g., RGB), such as 32×32×3).

One or more layers may include convolutional layers. The convolutional layers may compute the output of neurons that are connected to local regions in an input layer, each neuron computing a dot product between their weights and a small region they are connected to in the input volume. A result of the convolutional layers may be another volume, with one of the dimensions based on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from the 32×32×12 input volume).

One or more of the layers may include one or more fully connected layer(s). Each neuron in the fully connected layer(s) may be connected to each of the neurons in the previous volume. The fully connected layer may compute class scores, and the resulting volume may be 1×1×number of classes. In some examples, the CNN may include a fully connected layer(s) such that the output of one or more of the layers of the CNN may be provided as input to a fully connected layer(s) of the CNN. In some examples, one or more convolutional streams may be implemented by the machine learning model(s) 112, and some or all of the convolutional streams may include a respective fully connected layer(s).

Although input layers, convolutional layers, pooling layers, ReLU layers, and fully connected layers are discussed herein with respect to the machine learning model(s) 112, this is not intended to be limiting. For example, additional or alternative layers may be used in the machine learning model(s) 112, such as normalization layers, SoftMax layers, and/or other layer types.

In embodiments where the machine learning model(s) 112 includes a CNN, different orders and numbers of the layers of the CNN may be used depending on the embodiment. In other words, the order and number of layers of the machine learning model(s) 112 is not limited to any one architecture.

In addition, some of the layers may include parameters (e.g., weights), such as the convolutional layers and the fully connected layers, while others may not, such as the ReLU layers and pooling layers. In some examples, the parameters may be learned by the machine learning model(s) 112 during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited and may differ depending on the embodiment.

The post-processor 118 may be used to perform variety of tasks. For example, the post-processor 118 may analyze each of the confidences 116 computed by the machine learning model(s) 112 corresponding to each object/person pair and determine which confidence 116 (e.g., the highest confidence) indicates the most likely person to object association. In addition, in some embodiments, the post-processor 118 may perform temporal smoothing. For example, false positive associations (e.g., where an object and a person are incorrectly associated) and false negatives (where a person and object association is missed or incorrectly dissolves due to lighting changes, occlusion, obfuscation, etc.) may be reduced or even eliminated using temporal filtering on sequences of images. In such examples, temporal filtering may be performed by inputting contiguous sequences or snippets of sequential images into recurrent neural network (RNN), such as a long short-term memory (LSTM) network. Input to the RNN may include a combination of the probabilistic outputs of the machine learning model(s) 112 and the trajectory of an object and its corresponding subject hypothesis. For example, and without limitation, a sequence of five, seven, or any number of N plurality of sequences may be used as input. In some embodiments, associations that are determined in the majority, but missing or inconclusive in relatively fewer images (e.g., false negatives) may still be maintained throughout the entire sequence. Similarly, singular or otherwise relatively fewer associations may be determined as false positives and filtered out or ignored.

Figure 2A:
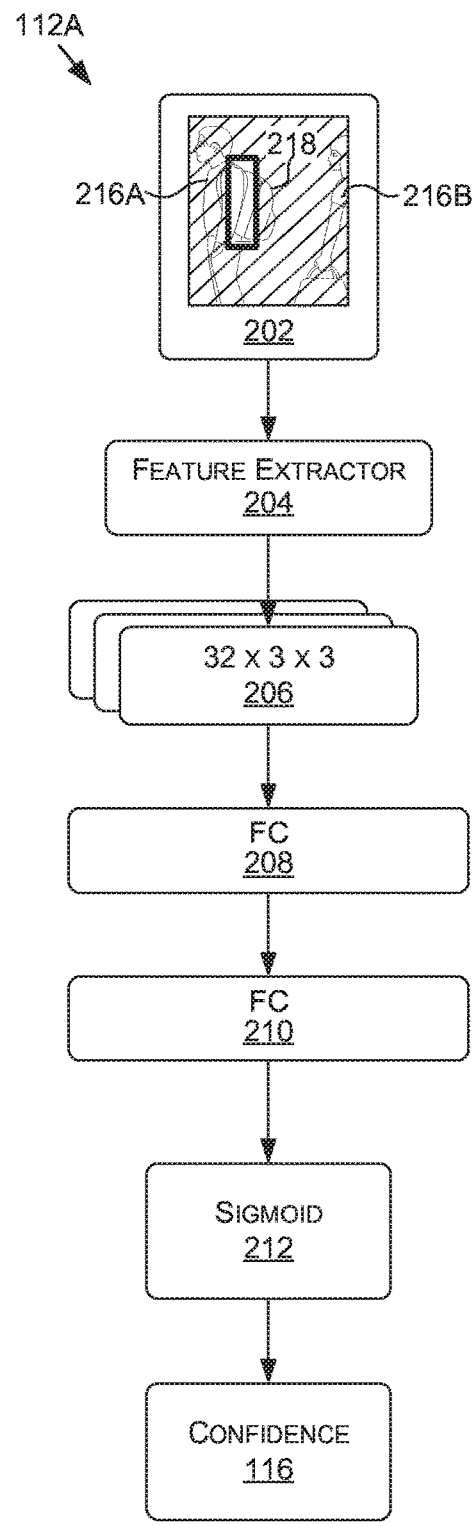
FIG. 2A is a diagram of an example machine learning model for associating persons with objects using an overlap region of the objects and persons, in accordance with some embodiments of the present disclosure.

Now referring to FIG. 2A, FIG. 2A is a diagram of an example machine learning model 112A for associating persons with objects using an overlap region between the persons and the object, in accordance with some embodiments of the present disclosure. For example, the machine learning model 112A may be one example architecture for the machine learning model 112 of FIG. 1. In some examples, because the machine learning model 112A may be a CNN, the machine learning model 112A may be referred to as CNN 112A. In addition, although the CNN 112A is illustrated as having the architecture of FIG. 2A, this is not intended to be limiting, and the CNN 112A may include a different architecture without departing from the scope of the present disclosure.

The CNN 112A may use masked sensor data 202 as input. The masked sensor data 202, similar to the masked sensor data 122 of FIG. 1, may include an overlap region with the remainder of the image masked out. For example, as illustrated in FIG. 2A, the portions of the image that are cross-hatched may represent the masked portions of the image, and the unmasked portion of the image may include the overlap region. As described herein, the overlap region may include the region of the image where the object 218 (or the bounding shape thereof) overlaps with the person 216A (or the bounding shape thereof). The masked sensor data 202 illustrates one instance, and in other instances, the comparison may be between the person 216B and the object 218, and/or persons and the object that may be within the association region as determined by the relationship determiner 110 (FIG. 1). As such, with respect to the masked sensor data 202, the masked sensor data 202 may be applied to the feature extractor 204 (e.g., including one or more feature extractor layers of the CNN 112A, such as one or more of the layer types described herein with respect to the machine learning model 112 of FIG. 1). The masked sensor data 202 may represent the actual pixel values within the overlap region and masked pixel values (e.g., 1, 0, etc.) corresponding to the mask applied to the remainder of the image. In other examples, instead of applying a mask, a crop may be applied to the sensor data to leave only the overlap region remaining. In such examples, the sensor data may be augmented to match a spatial dimension of the input layer of the CNN 112A.

The feature extractor 204 may include, in some non-limiting embodiments, a residual network. For example, the feature extractor 204 may include a deep neural network (DNN) that includes a large number of layers (e.g., 30-50 layers) and, to speed up convergence as well as the accuracy of the feature extractor 204, a residual network may be used. A residual network may use shortcut connections between layers by directly connecting the input of an nth layer to some (n+x)th layer (e.g., a skip connection) to learn residual functions with reference to the layer inputs, instead of learning unreferenced functions. In other examples, the feature extractor 204 may not include a residual network, and may include another type of feature extractor 204. The masked sensor data 202 may be received as input to the feature extractor 204, and the feature extractor 204 may output feature vectors 206 or a feature map corresponding to the masked sensor data 202. In some examples, the feature vectors 206 output by the feature extractor 204 may have a spatial resolution of 32×3×3, as illustrated in FIG. 2A, although this is not intended to be limiting. In any example, the feature vectors (and/or outputs from one or more additional layers of the CNN 112A, that may receive the feature vectors as input) may be applied to a fully connected (FC) layer 208. The FC layer 208 may then compute outputs which may be provided as input to another FC layer 210. In some examples, the dimension of the FC layer 208 may be greater than the dimension of the FC layer 210. Although multiple FC layers are illustrated in FIG. 2A, this is not intended to be limiting, and any number of FC layers (and/or other layer types) may be used without departing from the scope of the present disclosure. The output of the FC layer 210 may be applied to sigmoid function 212, in embodiments, and the output of the sigmoid function 212 may be a confidence 116. As such, the CNN 112A may be used—with respect to the instance of the masked sensor data 202 in FIG. 2A—to predict or compute a confidence that the object 218 belongs to the person 216A.

Figure 2B:
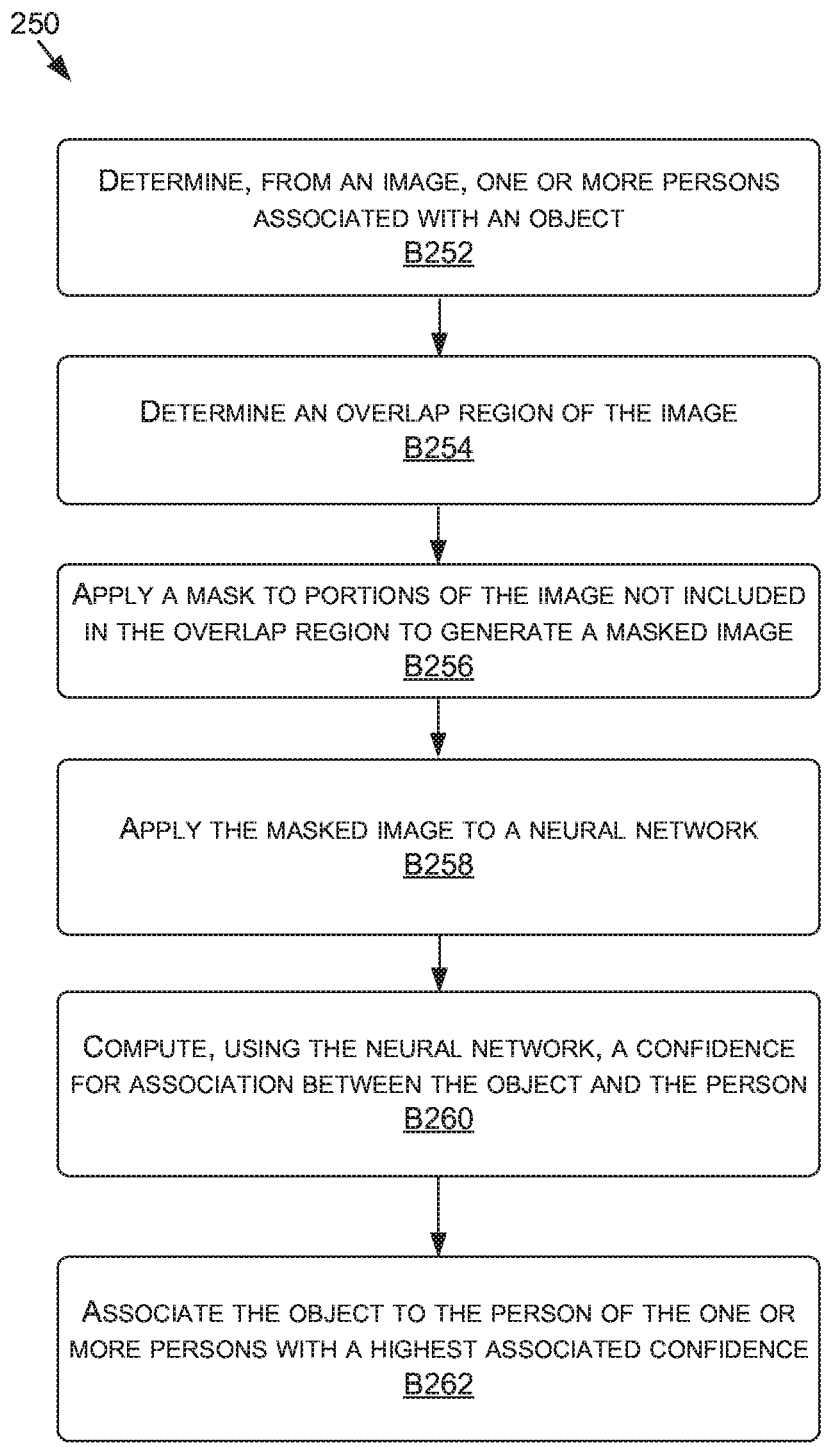
FIG. 2B is a data flow diagram of an example method for associating persons with objects based on the overlap of the objects and persons, in accordance with some embodiments of the present disclosure.

With reference to FIG. 2B, FIG. 2B is a diagram of an example method 250 for associating objects to persons using a machine learning model, in accordance with some embodiments of the present disclosure. Each block of the method 250 may comprise a computing process that may be performed using any combination of hardware, firmware, and/or software. For instance, various functions may be carried out by a processor executing instructions stored in memory. The method 250 may also be embodied as computer-usable instructions stored on computer storage media. The method 250 may be provided by a standalone application, a service or hosted service (standalone or in combination with another hosted service), or a plug-in to another product, to name a few. In addition, the method 250 is described, by way of example, with respect to FIGS. 1 and 2A. However, this method may additionally or alternatively be executed by any one system, or any combination of systems, including, but not limited to, those described herein.

The method 250, at block B252, includes determining, from an image, one or more persons associated with an object. For example, the method 250 may include determining, from the sensor data 102 and using the relationship determiner 110, one or more persons associated with an object. In some embodiments, such as where one or more persons are associated with an object, each of blocks B254, B256, B258, B260, and B262 may be performed for each of the one or more persons concurrently (e.g., using parallel processing of multiple instantiations of the machine learning model(s) 112) or may be performed sequentially (e.g., one person at a time).

The method 250, at block B254, includes determining an overlap region of the image. For example, determining the overlap region of the sensor data 102 corresponding to the overlap of the object region of the object and the person region of the person as represented by the sensor data 102.

The method 250, at block B256, includes applying a mask to portions of the image not included in the overlap region to generate a masked image. For example, applying a mask to portions of the sensor data 102 not included in the overlap region to generate the masked sensor data 122. In some examples, the masked sensor data 122 may be generated by the mask generator 108.

The method 250, at block B258, includes applying the masked image to a neural network. For example, the masked sensor data (e.g., 122 or 202) may be applied to the machine learning model(s) 112 (e.g., the CNN 112A).

The method 250, at block B260, includes computing, using the neural network, a confidence of an association between the object and the person. For example, the confidence 116 corresponding to the person 216A and the object 218 may be computed using the machine learning model(s) 112 (e.g., the CNN 112A). In addition, a confidence 116 may be computed for each person determined to be associated with or have a relationship with the object (e.g., the person 216B).

The method 250, at block B262, includes associating the object to the person of the one or more persons with a highest associated confidence. As described herein, the machine learning model(s) 112 may generate a plurality of confidences (e.g., one by each instantiation of the machine learning model(s) 112 corresponding to each person/object pair), and the object/person pair with the highest confidence output by the machine learning model(s) 112 may be determined to be the pairing of the object and the person. For example, the object 218 may be determined to be associated with the person 216A.

Figure 3A:
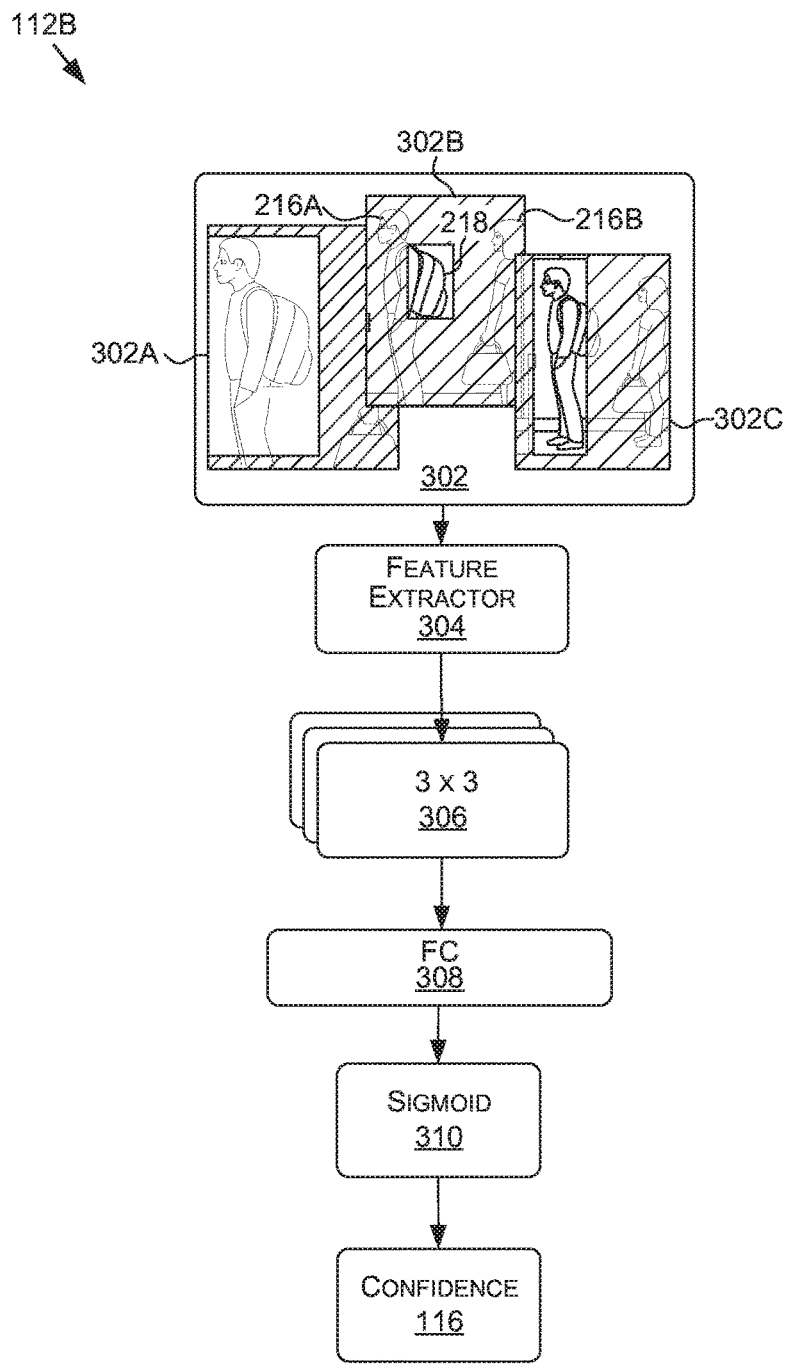
FIG. 3A is a diagram of an example machine learning model for associating persons with objects using multiple channels, in accordance with some embodiments of the present disclosure.

Now referring to FIG. 3A, FIG. 3A is a diagram of an example machine learning model 112B for associating persons with objects using multiple channels, in accordance with some embodiments of the present disclosure. For example, the machine learning model 112B may be one example architecture for the machine learning model 112 of FIG. 1. In some examples, because the machine learning model 112B may be a CNN, the machine learning model 112B may be referred to as CNN 112B. In addition, although the CNN 112B is illustrated as having the architecture of FIG. 3A, this is not intended to be limiting, and the CNN 112B may include a different architecture without departing from the scope of the present disclosure.

The CNN 112B may use masked sensor data 302 as input. The masked sensor data 302, similar to the masked sensor data 122 of FIG. 1, may include first masked sensor data 302A corresponding to a union region (e.g., the region of the image including the union of the person and the object, or the bounding shapes corresponding thereto) with the remainder of the image masked out, second masked sensor data 302B corresponding to an object region (e.g., the portion of the image corresponding to the object, or the bounding shape corresponding thereto) with the remainder of the image masked out, and third masked sensor data 302C corresponding to a person region (e.g., the portion of the image corresponding to the person, or the bounding shape corresponding thereto) with the remainder of the image masked out. For example, as illustrated in FIG. 3A, the portions of the image that are cross-hatched may represent the masked portions of the images, and the unmasked portion of the images may include the union region, the person region, and/or the object region. Each of the first masked sensor data 302A, the second masked sensor data 302B, and the third masked sensor data 302C may be generated from a same original sensor data (e.g., from the same image). The masked sensor data 302 illustrates one instance, and in other instances, the comparison may be between the person 216B and the object 218, and/or persons and the object that may be within the association region as determined by the relationship determiner 110 (FIG. 1). The masked sensor data 302 may represent the actual pixel values within the union region, the object region, and the person region, and the masked pixel values may be used to represent the remainder of the images not within the respective regions. In other examples, instead of applying a mask, a crop may be applied to the sensor data to leave only the union region, the object region, and the person region remaining. In such examples, the sensor data may be augmented to match a spatial dimension of the input layer of the CNN 112B.

As such, with respect to the masked sensor data 302, the masked sensor data 302 may be applied to the feature extractor 304 (e.g., including one or more feature extractor layers of the CNN 112B, such as one or more of the layer types described herein with respect to the machine learning model 112 of FIG. 1). In some examples, the feature extractor 304 may be similar to that of the feature extractor 204, described herein. In some embodiments, the masked sensor data 302 may be applied as input to the CNN 112B as a stack, or as multiple channels. The combined input of the masked sensor data 302 may be used by the feature extractor 304 to generate feature vectors 306 and/or a feature map corresponding to the masked sensor data 302. In some examples, the feature vectors output by the feature extractor 304 may have a spatial resolution of 3×3, as illustrated in FIG. 3A, although this is not intended to be limiting. The feature vectors 306 (and/or the output of one or more additional layers of the CNN 112B) may be applied to a FC layer 308. Although only a single FC layer 308 is illustrated in FIG. 3A, this is not intended to be limiting, and any number of FC layers 308 (and/or other layer types) may be used without departing from the scope of the present disclosure. The output of the FC layer 308 may be applied to a sigmoid function 310, in embodiments, and the output of the sigmoid function 310 may be a confidence 116. As such, the CNN 112B may be used—with respect to the instance of the masked sensor data 302 in FIG. 3A—to predict or compute a confidence that the object 218 belongs to the person 216A.

Figure 3B:
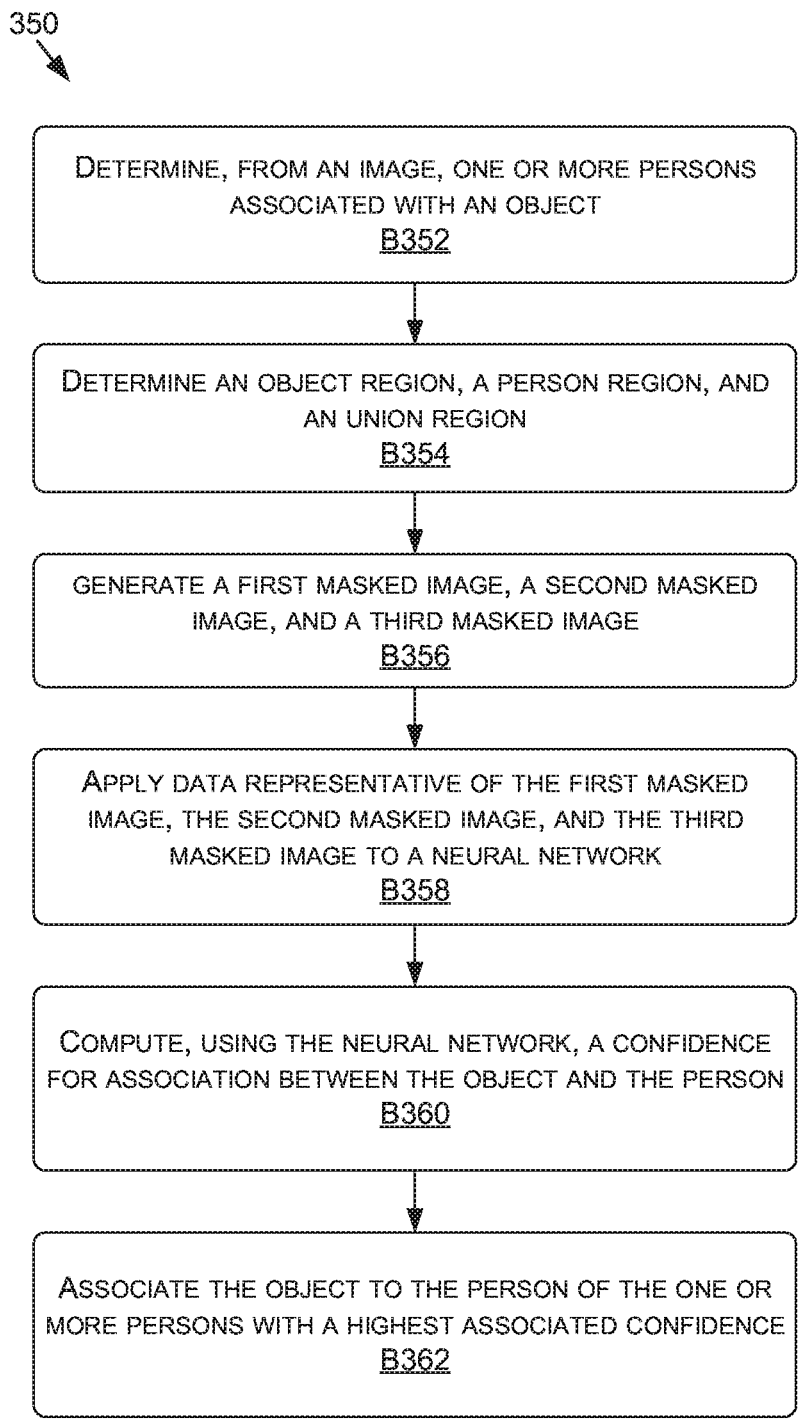
FIG. 3B is a data flow diagram of an example method for associating persons with objects using a multi-channel machine learning model, in accordance with some embodiments of the present disclosure.

With reference to FIG. 3B, FIG. 3B is a diagram of an example method 350 for associating objects to persons using a multi-channel machine learning model, in accordance with some embodiments of the present disclosure. Each block of the method 350 may comprise a computing process that may be performed using any combination of hardware, firmware, and/or software. For instance, various functions may be carried out by a processor executing instructions stored in memory. The method 350 may also be embodied as computer-usable instructions stored on computer storage media. The method 350 may be provided by a standalone application, a service or hosted service (standalone or in combination with another hosted service), or a plug-in to another product, to name a few. In addition, the method 350 is described, by way of example, with respect to FIGS. 1 and 3A. However, this method may additionally or alternatively be executed by any one system, or any combination of systems, including, but not limited to, those described herein.

The method 350, at block B352, includes determining, from an image, one or more persons associated with an object. For example, the method 350 may include determining, from the sensor data 102, one or more persons associated with an object. In some examples, the relationship determiner 110 may determine the associations between persons and objects, such as by using an association region within the image, as described herein. Where one or more persons are associated with an object, each of blocks B354, B356, B358, B360, and B362 may be performed for each of the one or more persons.

The method 350, at block B354, includes determining a union region, a person region, and an object region of the image. For example, the outputs of the object detector 106 may be used to determine the union region, the person region, and/or the object region of the image.

The method 350, at block B356, includes generating a first masked image, a second masked image, and a third masked image. For example, the union region may be used to generate the first masked sensor data 302A, the object region may be used to generate the second masked sensor data 302B, and the person region may be used to generate the third masked sensor data 302C.

The method 350, at block B358, includes applying data representative of the first masked image, the second masked image, and the third masked image to a neural network. For example, the first masked sensor data 302A, the second masked sensor data 302B, and the third masked sensor data 302C may be applied to the machine learning model(s) 112 (e.g., the CNN 112B). Different from machine learning model 112C, described herein at least with respect to FIG. 4A, the masked sensor data 302 may be applied as a stack, or channels, to a single stream of the CNN 112B, rather than applying each of the masked sensor data 302A, 302B, and 302C to a respective stream (as discussed with respect to the CNN 112C).

The method 350, at block B360, includes computing, using the neural network, a confidence for association between the object and the person. For example, the confidence 116 corresponding to the person 216A and the object 218 may be computed using the machine learning model(s) 112 (e.g., the CNN 112B). In addition, a confidence 116 may be computed for each person determined to be associated with or have a relationship with the object (e.g., the person 216B).

The method 350, at block B362, includes associating the object to the person of the one or more persons with a highest associated confidence. As described herein, the machine learning model(s) 112 may generate a plurality of confidences (e.g., one by each instantiation of the machine learning model(s) 112 corresponding to each person/object pair), and the object/person pair with the highest confidence output by the machine learning model(s) 112 may be determined to be the pairing of the object and the person. For example, the object 218 may be determined to be associated with the person 216A.

Figure 4A:
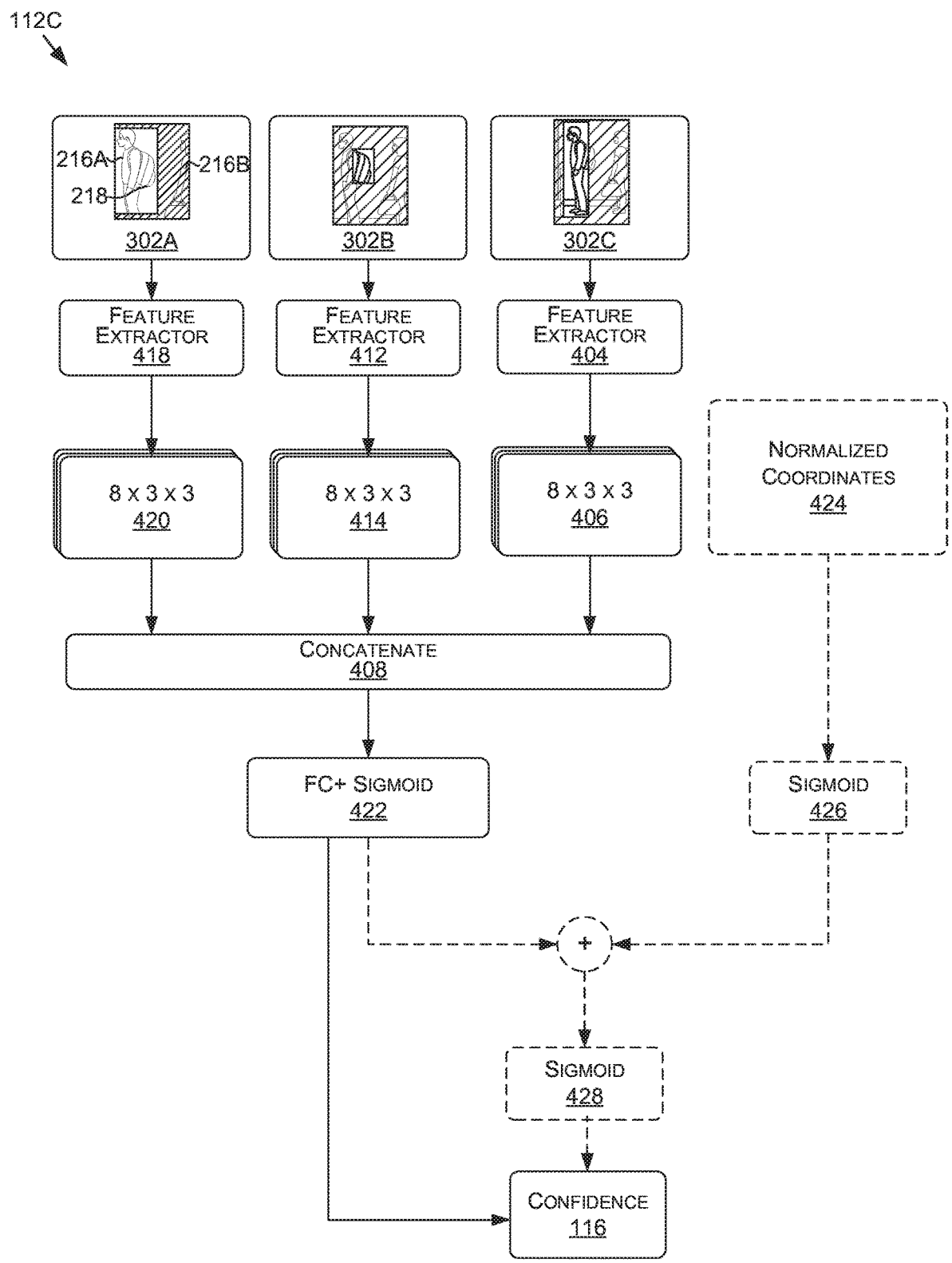
FIG. 4A is a diagram of an example machine learning model for associating persons with objects using multiple branches, in accordance with some embodiments of the present disclosure.

With reference to FIG. 4A, FIG. 4A is a diagram of an example machine learning model for associating persons with objects using multiple branches or streams, in accordance with some embodiments of the present disclosure. For example, the machine learning model 112C may be one example architecture for the machine learning model 112 of FIG. 1. In some examples, because the machine learning model 112C may be a CNN, the machine learning model 112C may be referred to as CNN 112C. In addition, although the CNN 112C is illustrated as having the architecture of FIG. 4A, this is not intended to be limiting, and the CNN 112C may include a different architecture without departing from the scope of the present disclosure.

The CNN 112C may use masked sensor data 302 as input, which may be similar to the masked sensor data 302 described herein at least with respect to FIG. 3A. However, distinguished from the CNN 112B described with respect to FIG. 3A, the masked sensor data 302 of FIG. 4A may be applied to a plurality of convolutional streams or branches of the CNN 112C. For example, the first masked sensor data 302A may be applied to a first convolutional stream that includes a feature extractor 418 (which may the same or similar to the feature extractor 204 described with respect to FIGS. 2A and/or 3A), the second masked sensor data 302B may be applied to a second convolutional stream that includes a feature extractor 412 (which may the same or similar to the feature extractor described with respect to FIGS. 2A and/or 3A), and the third masked sensor data 302C may be applied to a third convolutional stream that includes a feature extractor 404 (which may the same or similar to the feature extractor described with respect to FIGS. 2A and/or 3A). As such, each respective masked sensor data 302 may have respective feature vectors 420, 414, and 406 and/or feature maps generated by the feature extractor 418, 412, and 404, respectively. As a result, with respect to the masked sensor data 302 may be applied to the feature extractors 420, 414, 406 (e.g., each including one or more feature extractor layers of the CNN 112C, such as one or more of the layer types described herein with respect to the machine learning model 112 of FIG. 1). In some examples, the feature extractors 420, 414, and 406 may be similar to that of the feature extractor 204 and/or 304, described herein. However, by using separate convolutional streams, each feature extractor may be trained to predict feature vectors that correspond to a specific type of masked sensor data 302 (e.g., the first stream may be trained on union regions, the second stream on object regions, and the third stream on person regions). As such, the CNN 112C may generate more accurate feature vectors due to the specific focus during training on updating the parameters (e.g., weights and biases) of the streams for the respective type of masked sensor data 302. In some examples, the feature vectors output by the feature extractors may have a spatial resolution of 3×3, or 8×3×3 (as illustrated in FIG. 4A), although this is not intended to be limiting. The feature vectors 420, 414, and 406 (and/or the outputs of one or more additional layers of the streams) may be concatenated at block 408, and the concatenated output may be applied to a FC layer and a sigmoid function 422. Although only a single FC layer is illustrated in FIG. 4A, this is not intended to be limiting, and any number of FC layers (and/or other layer types) may be used without departing from the scope of the present disclosure. The output of the FC layer and sigmoid function may be a confidence 116. As such, the CNN 112C may be used—with respect to the instance of the masked sensor data 302 in FIG. 4A—to predict or compute a confidence that the object 218 belongs to the person 216A.

In some embodiments, as illustrated with dashed lines in FIG. 4A, normalized coordinates 424 may be used as an additional input for the CNN 112C for determining the confidence 116. For example, the normalized coordinates 424 may include some or all of the coordinates 120 described with respect to FIG. 1. In a non-limiting embodiment, the normalized coordinates 424 may include person coordinates (e.g., coordinates corresponding to the person region, such as the bounding shape delineating the person region), object coordinates (e.g., coordinates corresponding to the object region, such as the bounding shape delineating the object region), and/or a ratio of the person region to the object region. The normalized coordinates 424 may provide additional information for the CNN 112C with respect to predicting the confidence 116. Although described as normalized coordinates, this is not intended to be limiting, and in some examples, the coordinates may not be normalized.

In examples where the normalized coordinates are used, the normalized coordinates 424 may be applied to a sigmoid function 426, and the output of the sigmoid function 426 may be combined, or concatenated, with the output of the FC layer and sigmoid function 422. These combined outputs may then be applied to a sigmoid function 428 and the sigmoid function 428 may output the confidence 116. As such, the CNN 112C may be used—with respect to the instance of the masked sensor data 302 and the normalized coordinates 424 in FIG. 4A—to predict or compute a confidence that the object 218 belongs to the person 216A.

Figure 4B:
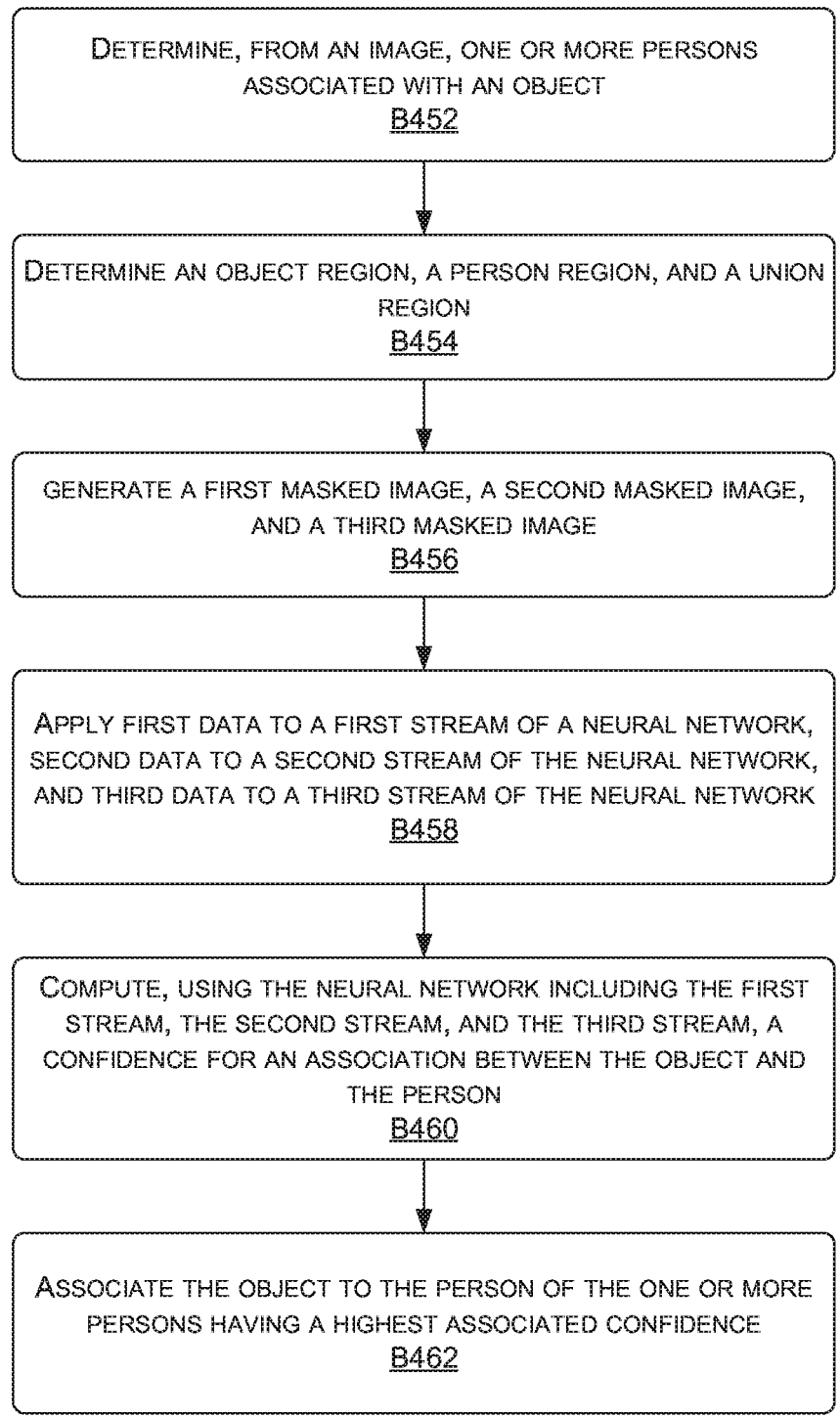
FIG. 4B is a data flow diagram of an example method for associating persons with objects using a multi-branch machine learning model, in accordance with some embodiments of the present disclosure.

With reference to FIG. 4B, FIG. 4B is a diagram of an example method 450 for associating objects to persons using a multi-stream machine learning model, in accordance with some embodiments of the present disclosure. Each block of the method 450 may comprise a computing process that may be performed using any combination of hardware, firmware, and/or software. For instance, various functions may be carried out by a processor executing instructions stored in memory. The method 450 may also be embodied as computer-usable instructions stored on computer storage media. The method 450 may be provided by a standalone application, a service or hosted service (standalone or in combination with another hosted service), or a plug-in to another product, to name a few. In addition, the method 450 is described, by way of example, with respect to FIGS. 1 and 4A. However, this method may additionally or alternatively be executed by any one system, or any combination of systems, including, but not limited to, those described herein.

The method 450, at block B452, includes determining, from an image, one or more persons associated with an object. For example, one or more persons associated with an object may be determined. In some examples, the relationship determiner 110 may determine the associations between persons and objects, such as by using an association region within the image, as described herein. Where one or more persons are associated with an object, each of blocks B454, B456, B458, B460, and B462 may be performed for each of the one or more persons.

The method 450, at block B454, includes determining a union region, a person region, and an object region of the image. For example, the outputs of the object detector 106 may be used to determine the union region, the person region, and/or the object region of the image.

The method 450, at block B456, includes generating a first masked image, a second masked image, and a third masked image. For example, the union region may be used to generate the first masked sensor data 302A, the object region may be used to generate the second masked sensor data 302B, and the person region may be used to generate the third masked sensor data 302C.

The method 450, at block B458, includes applying first data to a first stream of a neural network, second data to a second stream of the neural network, and third data to a third stream of the neural network. For example, the first masked sensor data 302A may be applied to a first stream of the CNN 112C, the second masked sensor data 302B may be applied to a second stream of the CNN 112C, and the third masked sensor data 302C may be applied to a third stream of the CNN 112C.

The method 450, at block B460, includes computing, using the neural network including the first stream, the second stream, and the third stream, a confidence for association between the object and the person. For example, the confidence 116 corresponding to the person 216A and the object 218 may be computed using the machine learning model(s) 112 (e.g., the CNN 112C), where the first stream, the second stream and the third stream are used to make the prediction. In addition, a confidence 116 may be computed for each person determined to be associated with or have a relationship with the object (e.g., the person 216B).

The method 450, at block B462, includes associating the object to the person of the one or more persons with a highest associated confidence. As described herein, the machine learning model(s) 112 may generate a plurality of confidences (e.g., one by each instantiation of the machine learning model(s) 112 corresponding to each person/object pair), and the object/person pair with the highest confidence output by the machine learning model(s) 112 may be determined to be the pairing of the object and the person. For example, the object 218 may be determined to be associated with the person 216A.

Figure 5A:
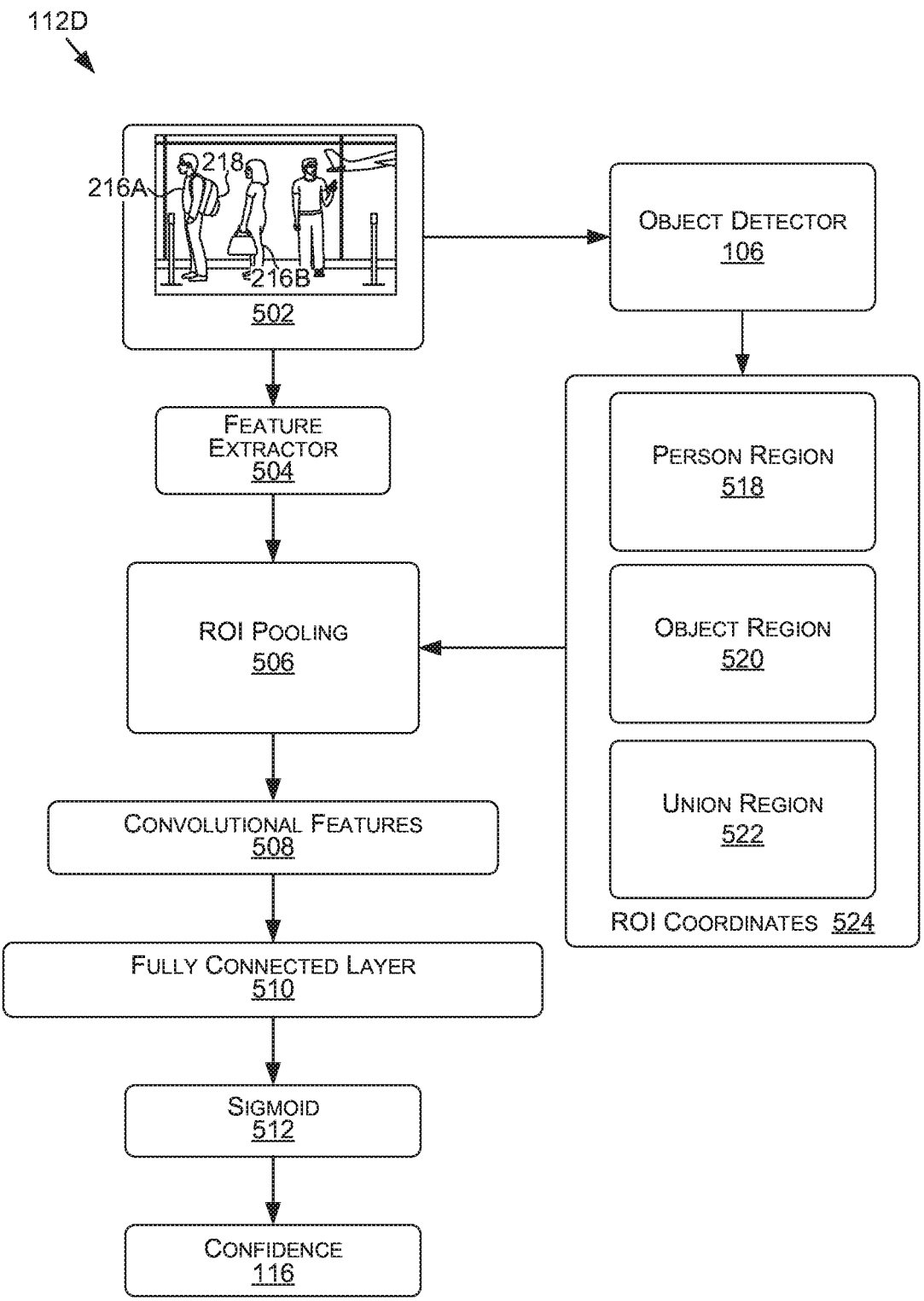
FIG. 5A is a diagram of an example machine learning model for associating persons with objects using region of interest (ROI) pooling, in accordance with some embodiments of the present disclosure.

Now referring to FIG. 5A, FIG. 5A is a diagram of an example machine learning model 112D for associating persons with objects using region of interest (ROI) pooling. For example, the machine learning model 112D may be one example architecture for the machine learning model 112 of FIG. 1. In some examples, because the machine learning model 112D may be a CNN, the machine learning model 112D may be referred to as CNN 112D. In addition, although the CNN 112D is illustrated as having the architecture of FIG. 5A, this is not intended to be limiting, and the CNN 112D may include a different architecture without departing from the scope of the present disclosure.

The CNN 112D may use sensor data 502 (e.g., unmasked sensor data) as input, which may be similar to the sensor data 102 described herein at least with respect to FIG. 1. The sensor data 502 may be applied to the feature extractor 504 of the CNN 112D (e.g., including one or more feature extractor layers of the CNN 112D, such as one or more of the layer types described herein with respect to the machine learning model 112 of FIG. 1). In some examples, the feature extractor 504 may be similar to that of the feature extractor 204 and/or 304, described herein. The feature vectors or feature maps output by the feature extractor 504 may be applied to region of interest (ROI) pooling layers 506. The ROI pooling layers may be used to perform a pooling operation (e.g., a filter) on the feature vectors or feature maps generated by the feature extractor 504. The pooling layers may reduce the size of the feature vectors or the feature map by some factor (e.g., a factor of 2, 3, etc.), to account for the potential of small movements in the position of features in the input image (e.g., the sensor data 502). For example, the pooling layers 506 may be used to summarize the average presence of a feature and the most active presence of a feature, respectively. In some examples, in addition to the feature maps, ROI coordinates 524 may be applied to the ROI pooling layers 506 of the CNN 112D. The ROI coordinates 524 may aid the ROI pooling layers 506 in predicting information specific to the regions identified by the ROI coordinates 524—e.g., person region 518, object region 520, and union region 522. For example, the person region 518 ROI coordinates 524 may include the coordinates 120 corresponding to the person region 518, the object region 520 ROI coordinates 524 may include the coordinates 120 corresponding to the object region 520, and the union region 522 ROI coordinates 524 may include the coordinates 120 corresponding to the union region 522. By providing the ROI coordinates 524 to the ROI pooling layers 506, the CNN 112D may more accurately account for the portions of the feature map computed by the feature extractor 504 that correspond to the person region 518, the object region 520, and the union region 522. For example, the ROI pooling layers 506 when using the ROI coordinates 524 may use the exact—or close to the exact—pooled features that correspond to the person, the bag, and/or the union thereof. As such, without having to generate masked sensor data corresponding to each of these regions (thereby reducing the pre-processing requirements of the system), the CNN 112D is able to account for these regions using the ROI pooling layers 506 and the ROI coordinates 524, thereby reducing the computational expense and run-time of the CNN 112D as compared to other approaches. In addition, training times for training the CNN 112D are significantly reduced when using ROI pooling.

The outputs of the ROI pooling layers 506 may include the convolutional features 508, and the convolutional features 508 (and/or an output of any additional layers of the CNN 112D) may be provided to a fully connected layer 510. Although only a single FC layer is illustrated in FIG. 5A, this is not intended to be limiting, and any number of FC layers (and/or other layer types) may be used without departing from the scope of the present disclosure. The output of the fully connected layer 510 may be applied to a sigmoid function 512 to generate the confidence 116. As such, the CNN 112D may be used—with respect to the instance of the sensor data 502 and the ROI coordinates 524 in FIG. 5A—to predict or compute a confidence that the object 218 belongs to the person 216A.

Figure 5B:
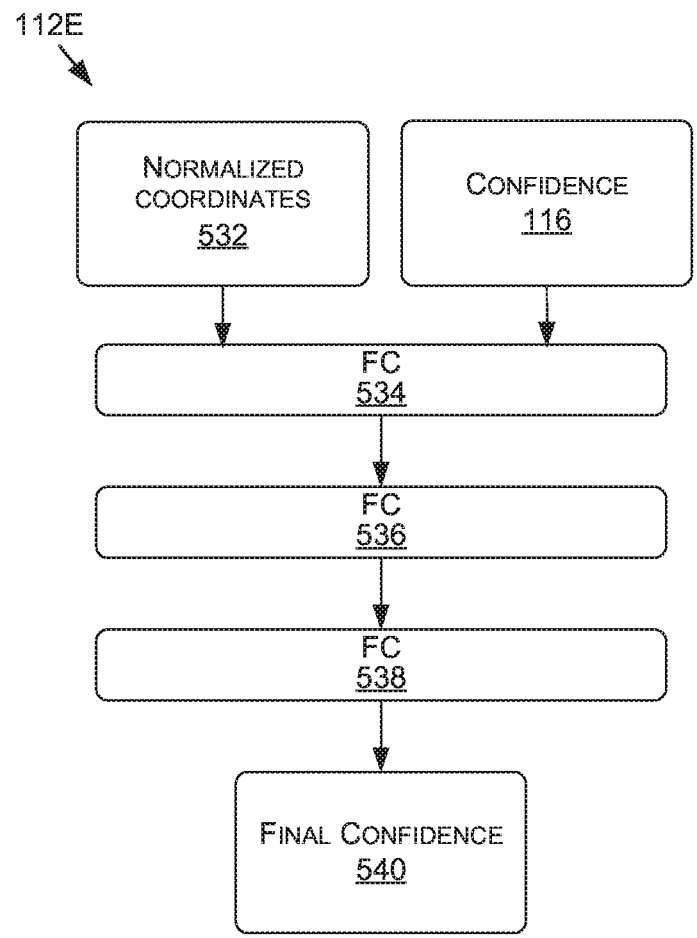
FIG. 5B is a diagram of an example machine learning model for associating persons with objects using ROI pooling in combination with a multi-layer perceptron (MLP) network, in accordance with some embodiments of the present disclosure.

Now referring to FIG. 5B, FIG. 5B is a diagram of an example machine learning model 112E for associating persons with objects using the ROI pooling of FIG. 5A with a multi-layer perceptron (MLP) network. For example, the machine learning model 112E may be one example architecture for the machine learning model 112 of FIG. 1. In some examples, because the machine learning model 112E may be an MLP network, the machine learning model 112E may be referred to as MLP 112E. In addition, although the MLP 112E is illustrated as having the architecture of FIG. 5B, this is not intended to be limiting, and the MLP 112E may include a different architecture without departing from the scope of the present disclosure.

The MLP 112E may receive the confidence 116—as computed by the CNN 112D—and normalized coordinates 532 as input. For example, the normalized coordinates 532 may include some or all of the coordinates 120 described with respect to FIG. 1. In a non-limiting embodiment, the normalized coordinates 532 may include person coordinates (e.g., coordinates corresponding to the person region, such as the bounding shape delineating the person region), object coordinates (e.g., coordinates corresponding to the object region, such as the bounding shape delineating the object region), a ratio of the person region to a union region, and/or a ratio of the object region to the union region. The normalized coordinates 532 may provide additional information for the MLP 112E with respect to predicting a final confidence 540. Although described as normalized coordinates, this is not intended to be limiting, and in some examples, the coordinates may not be normalized.

The normalized coordinates 532 and the confidence 116 may be provided as input to one or more FC layers, such as FC layer 534. For example, the normalized coordinates 532 and the confidence 116 may be input to the FC layer 534, the output of the FC layer 534 may be provided as input to an FC layer 536, the output of the FC layer 536 may be provided as input to an FC layer 538, and the output of the FC layer 538 may be the final confidence 540. In some examples, the FC layers 534 and 536 may output a larger dimension than the FC layer 538. For a non-limiting embodiment, the FC layers 534 and 536 may have a dimension of 64 while the FC layer 538 may have a dimension of 1 (e.g., indicative of the final confidence 540). Although three FC layers are illustrated in FIG. 5B, this is not intended to be limiting, and any number of FC layers (and/or other layer types) may be used without departing from the scope of the present disclosure.

Figure 5C:
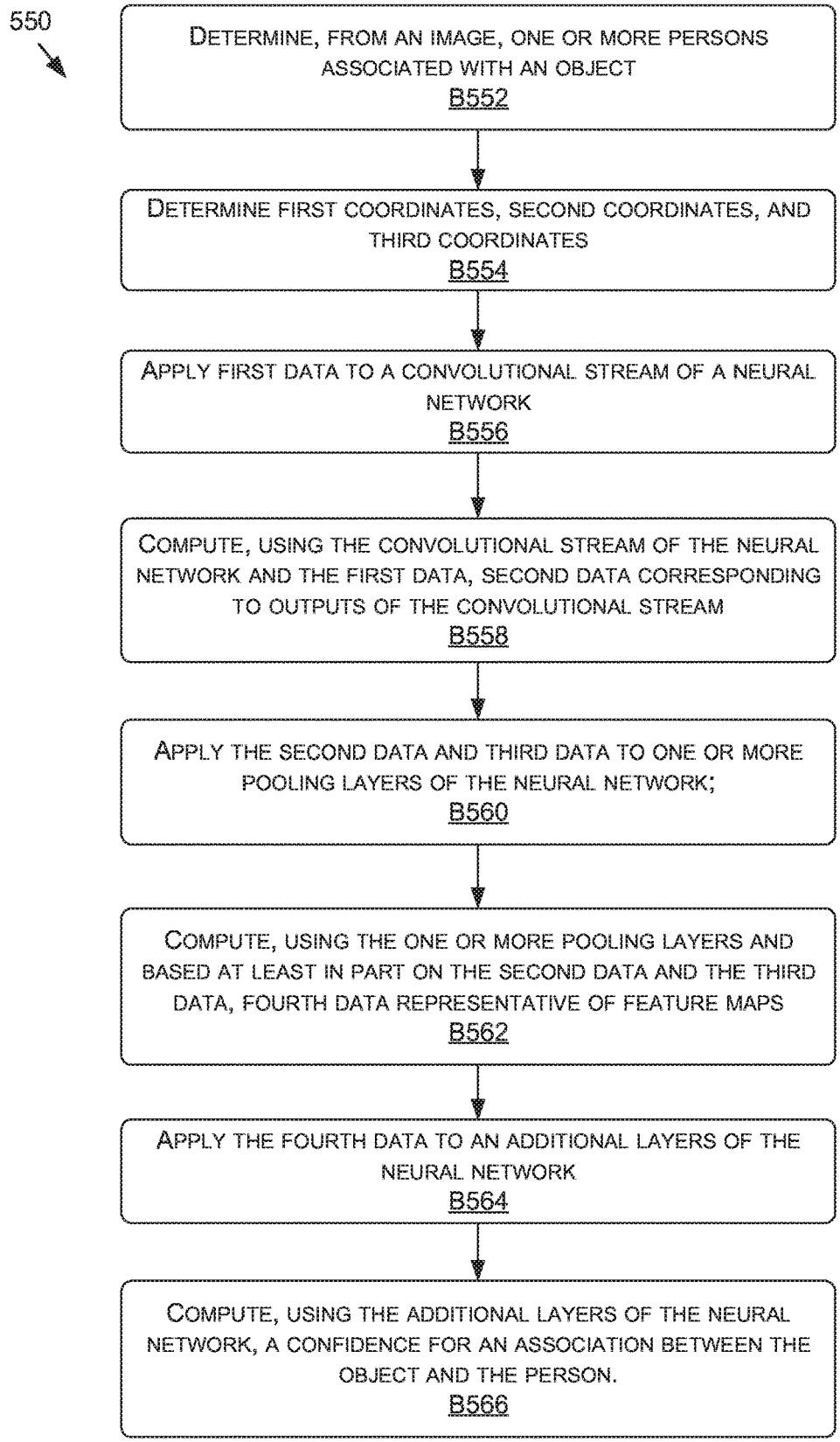
FIG. 5C is a data flow diagram of an example method for associating persons with objects using ROI pooling, in accordance with some embodiments of the present disclosure.

Now referring to FIG. 5C, FIG. 5C is a flow diagram of an example method 550 for associating objects to persons using ROI pooling, in accordance with some embodiments of the present disclosure. Each block of the method 550 may comprise a computing process that may be performed using any combination of hardware, firmware, and/or software.

For instance, various functions may be carried out by a processor executing instructions stored in memory. The method 550 may also be embodied as computer-usable instructions stored on computer storage media. The method 550 may be provided by a standalone application, a service or hosted service (standalone or in combination with another hosted service), or a plug-in to another product, to name a few. In addition, the method 550 is described, by way of example, with respect to FIGS. 1 and 5A. However, this method may additionally or alternatively be executed by any one system, or any combination of systems, including, but not limited to, those described herein.

The method 550, at block B552, includes determining, from an image, one or more persons associated with an object. For example, one or more persons associated with an object may be determined. In some examples, the relationship determiner 110 may determine the associations between persons and objects, such as by using an association region within the image, as described herein. Where one or more persons are associated with an object, each of blocks B554, B556, B558, B560, B562, B564, and B566 may be performed for each of the one or more persons.

The method 550, at block B554, includes determining first coordinates, second coordinates, and third coordinates. For example, the ROI coordinates 524 corresponding to the person region 518, the object region 520, and the union region 522 may be determined.

The method 550, at block B556, includes applying first data to a convolutional stream of a neural network. For example, the sensor data 502 may be applied to the feature extractor 504 of the CNN 112D.

The method 550, at block B558, includes computing using the convolutional stream of the neural network and the first data, second data corresponding to outputs of the convolutional stream. For example, the feature extractor 504 may be used to compute feature maps corresponding to the sensor data 504.

The method 550, at block B560, includes applying the second data and third data to one or more pooling layers of the neural network. For example, data representative of the feature maps in addition to the ROI coordinates 524 may be applied to the ROI pooling layers 506 of the CNN 112D.

The method 550, at block B562, includes computing, using the one or more pooling layers and based at least in part on the second data and the third data, fourth data representative of feature maps. For example, the convolutional features 508 may be computed using the ROI pooling layers 506.

The method 550, at block B564, includes applying the fourth data to additional layers of the neural network. For example, data corresponding to the feature maps computed by the ROI pooling layers 506 may be applied to additional layers of the CNN 112D, such as the fully connected layer 510.

The method 550, at block B566, includes computing, using the additional layers of the neural network, a confidence for an association between the object and the person. For example, the confidence 116 may be computed by the CNN 112D.

Figure 6:
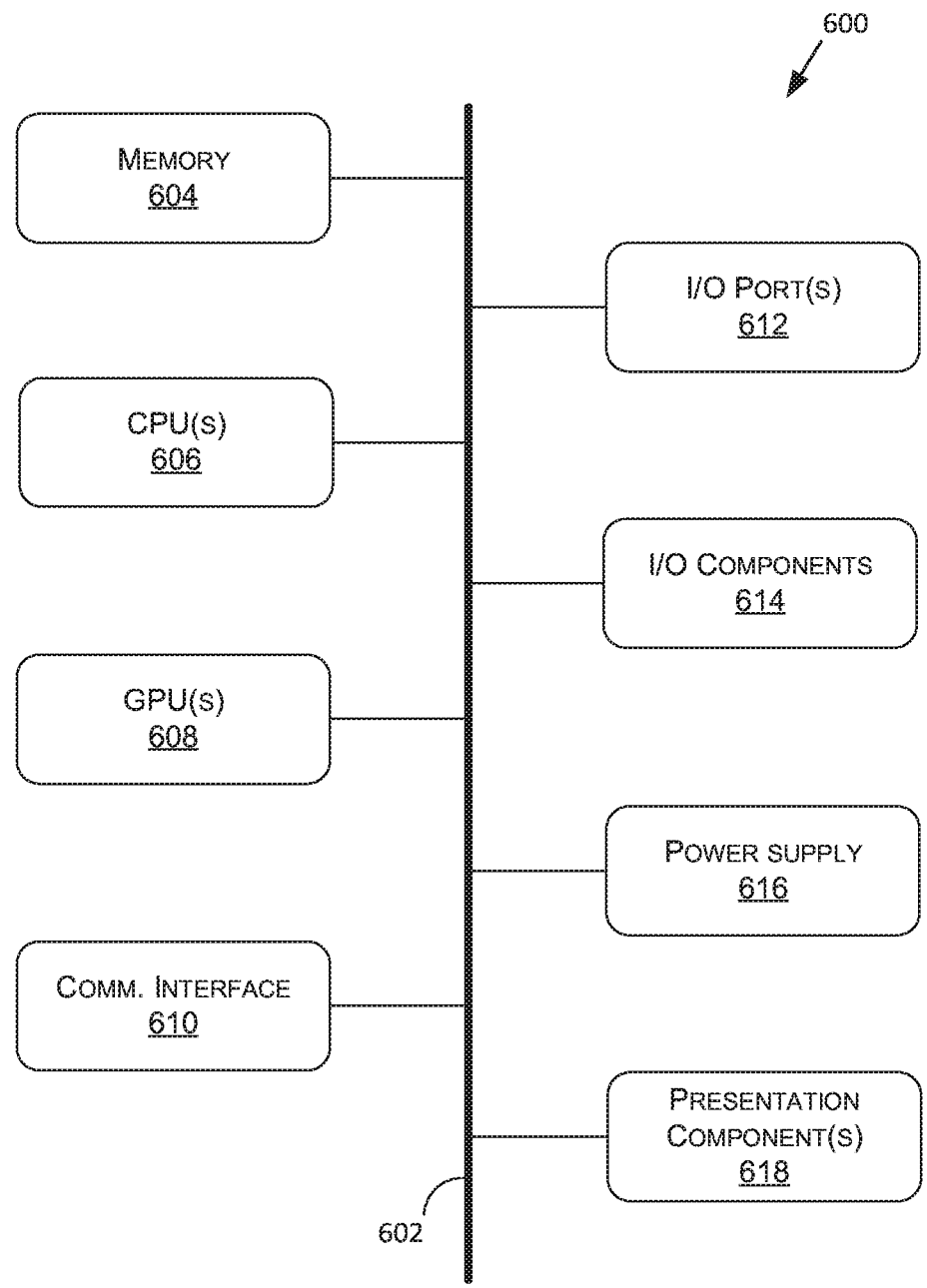
FIG. 6 is a block diagram of an example computing device suitable for use in implementing some embodiments of the present disclosure.

FIG. 6 is a block diagram of an example computing device 600 suitable for use in implementing some embodiments of the present disclosure. For example, the computing device 600 may be used to perform some or all of the processing corresponding to any of the processes or methods described herein, and/or may be used to at least partly train and/or deploy one or more of the machine learning models described herein—such as with respect to FIGS. 2A-5C.

The computing device 600 may include a bus 602 that directly or indirectly couples the following devices: memory 604, one or more central processing units (CPUs) 606, one or more graphics processing units (GPUs) 608 that may include one or more hardware accelerators dedicated to performing one or more processing tasks including, without limitation, programmable vision accelerators, deep learning accelerators, or codec accelerators, a communication interface 610, input/output (I/O) ports 612, input/output components 614 (i/o component(s)), a power supply 616, and one or more presentation components 618 (e.g., display(s)).

Although the various blocks of FIG. 6 are shown as connected via the bus 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 6.

The bus 602 may represent one or more busses, such as an address bus, a data bus, a control bus, or a combination thereof. The bus 602 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 606 may be configured to execute the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an ARM processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

The GPU(s) 608 may be used by the computing device 600 to render graphics (e.g., 3D graphics). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data. The display memory may be included as part of the memory 604. The GPU(s) 708 may include two or more GPUs operating in parallel (e.g., via a link). When combined together, each GPU 608 may generate pixel data for different portions of an output image or for different output images (e.g., a first GPU for a first image and a second GPU for a second image). Each GPU may include its own memory, or may share memory with other GPUs.

In examples where the computing device 600 does not include the GPU(s) 608, the CPU(s) 606 may be used to render graphics.

The communication interface 610 may include one or more receivers, transmitters, and/or transceivers that enable the computing device 700 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

determining, from an image, one or more persons associated with an object;

for each person of the one or more persons, performing operations comprising:

determining an overlap region of the image corresponding to an overlap in the image between an object region of the object and a person region of the person;

applying a mask to portions of the image not included in the overlap region to generate a masked image;

applying data representative of the masked image to a neural network trained to predict confidences for associations between objects and persons; and computing, using the neural network and based at least in part on the data, a confidence for an association between the object and the person; and based on the confidence for each person of the one or more persons, associating the object to the person of the one or more persons having a highest associated confidence.

2. The method of claim 1, wherein the determining the one or more persons associated with an object further comprises:

generating an association region for the object; and determining that the one or more persons or one or more bounding shapes corresponding to the one or more persons at least partially overlap with the association region.

3. The method of claim 2, wherein the association region is defined by dimensions extending from a centroid of the object or a bounding shape corresponding to the object, and the association region is larger than the object or the bounding shape corresponding to the object.

4. The method of claim 1, wherein the person region includes a first portion of the image corresponding to a person bounding shape of the person, the object region includes a second portion of the image corresponding to an object bounding shape of the object, and the overlap region includes a third portion of the image corresponding to an overlap of the person bounding shape with the object bounding shape.

5. The method of claim 1, wherein the image is a most recent image in a sequence of images, and temporal smoothing is used to weight the confidence in view of prior confidences predicted for associations between the person and the object to generate a final confidence, further wherein the final confidence is used for the associating the object to the person.

* * * * *